June 5, 1956 P. R. FECHHEIMER ET AL 2,749,007
ROTARY FILLING MACHINE
Filed Nov. 6, 1952 6 Sheets-Sheet 1

FIG.1.

INVENTORS.
PAUL R. FECHHEIMER,
EDWARD F. ROWEKAMP
AND ALFRED J. SWING,
Allen & Allen
ATTORNEYS.

INVENTORS.
PAUL R. FECHHEIMER,
EDWARD F. ROWEKAMP,
BY AND ALFRED J. SWING,

Allen & Allen
ATTORNEYS.

June 5, 1956    P. R. FECHHEIMER ET AL    2,749,007
ROTARY FILLING MACHINE
Filed Nov. 6, 1952    6 Sheets-Sheet 4

INVENTORS.
PAUL R. FECHHEIMER,
EDWARD F. ROWEKAMP
BY AND ALFRED J. SWING,
Allen & Allen
ATTORNEYS.

June 5, 1956   P. R. FECHHEIMER ET AL   2,749,007
ROTARY FILLING MACHINE

Filed Nov. 6, 1952   6 Sheets-Sheet 5

INVENTORS.
PAUL R. FECHHEIMER,
EDWARD F. ROWEKAMP
BY AND ALFRED J. SWING,

*Allen & Allen*
ATTORNEYS.

INVENTORS.
PAUL R. FECHHEIMER,
EDWARD F. ROWEKAMP
AND ALFRED J. SWING,
BY Allen & Allen
ATTORNEYS.

United States Patent Office 2,749,007
Patented June 5, 1956

2,749,007

ROTARY FILLING MACHINE

Paul R. Fechheimer, Edward F. Rowekamp, and Alfred J. Swing, Cincinnati, Ohio, assignors to The Karl Kiefer Machine Company, Cincinnati, Ohio, a corporation of Ohio Application November 6, 1952, Serial No. 319,126

21 Claims. (Cl. 226—97)

Our invention relates to filling machines for cans, jars, bottles and the like, and relates particularly to rotary filling machines in which filling spouts for the containers have been mounted on a rotary head element and in which appropriate apparatus is provided for delivering through each of the filling spouts measured increments of the filling material. Such machines have hitherto been made in which the containers are delivered to platforms on a table rotating beneath the filling head, and the platforms have been arranged to be raised and lowered so as not only to bring the containers into and out of juxtaposition to the pouring spouts, but also to cause the containers themselves to actuate means in connection with the spouts for various purposes inclusive of the purpose of avoiding discharge of the filling material if no container is present to receive it.

Filling machines having rotary filling heads are taught in Kiefer Patent 1,313,301 and Fechheimer Patent 2,184,-117. In these patents the filling head comprises a rotary head element and a fixed head element in face-to-face contact. The rotary head element carries the filling spouts about its periphery and passageways are provided extending through the rotary head element in communication with each of the filling spouts. The passageways terminate upwardly in inlet ports which are adapted to be contacted serially by an outlet port in the fixed filling head through which filling material is supplied, the filling material being pumped to the outlet port from a source of supply. With this arrangement the filling head is utilized as the means for controlling the flow of filling material from the pump and maintaining that flow through one or substantially only one spout at a time. Thus, as taught in the patents referred to above, it was necessary to have one inlet port opening as the next adjacent port is closed in order to prevent the pump from delivering against a closed line, but the length of the outlet port in the fixed head in relation to the diameter of the inlet ports in the rotary head was relatively great so that two spouts were open to the flow for only a small percentage of the total filling time. Therefore, if there was a disparity in the flow of filling material through two adjacent spouts while they were simultaneously open, the resultant effect on the total was negligible. However, where it is desired to provide a rotary filling machine for filling large containers such, for example, as gallon cans or jars at high speeds, it becomes impractical to follow the teachings of the prior art because of the large diameter of the filling head which would be required.

It is therefore a principal object of the present invention to provide a rotary filling machine particularly adapted to fill large size containers at high speed wherein the filling head is maintained at a comparatively small diameter with the result that two filling spouts are opened to the flow of filling material simultaneously for a considerable length of time. We then prevent the simultaneous flow through both spouts by providing valve elements at the terminus of the filling spouts and so locating the spout actuating means and so maintaining the length and shape of the spouts that as one spout is closed the next adjacent spout is opened.

It is a further object of our invention to provide a filling machine particularly suited to filling large containers, and wherein the filling material is introduced into the containers in metered increments.

It is a further object of our invention to provide means which will permit the more rapid filling of large containers, particularly where the containers are to be filled with substances which do not flow readily, but are rather of a semi-fluid or viscous consistency.

Yet another object of our invention is the provision of a filling machine which will permit the filling of containers with measured quantities of more than one substance, if desired.

Yet another object of our invention is the provision of improved no can-no fill mechanism, whereby discharge of the filling material from a given filling spout will be prevented if no container is present beneath the filling spout to receive the filling material.

Still a further object of our invention is the provision of improved safety features for the machine, including the provision of a control system for synchronizing the operation of the pumps and filling spouts which is instantaneously responsive to the control of the machine operator.

These and other objects of our invention which will be apparent to the skilled worker in the art upon reading these specifications, we accomplish by that construction and arrangement of parts of which we shall now describe an exemplary embodiment.

Reference is now made to the accompanying drawings wherein.

The basic machine

Figure 1:
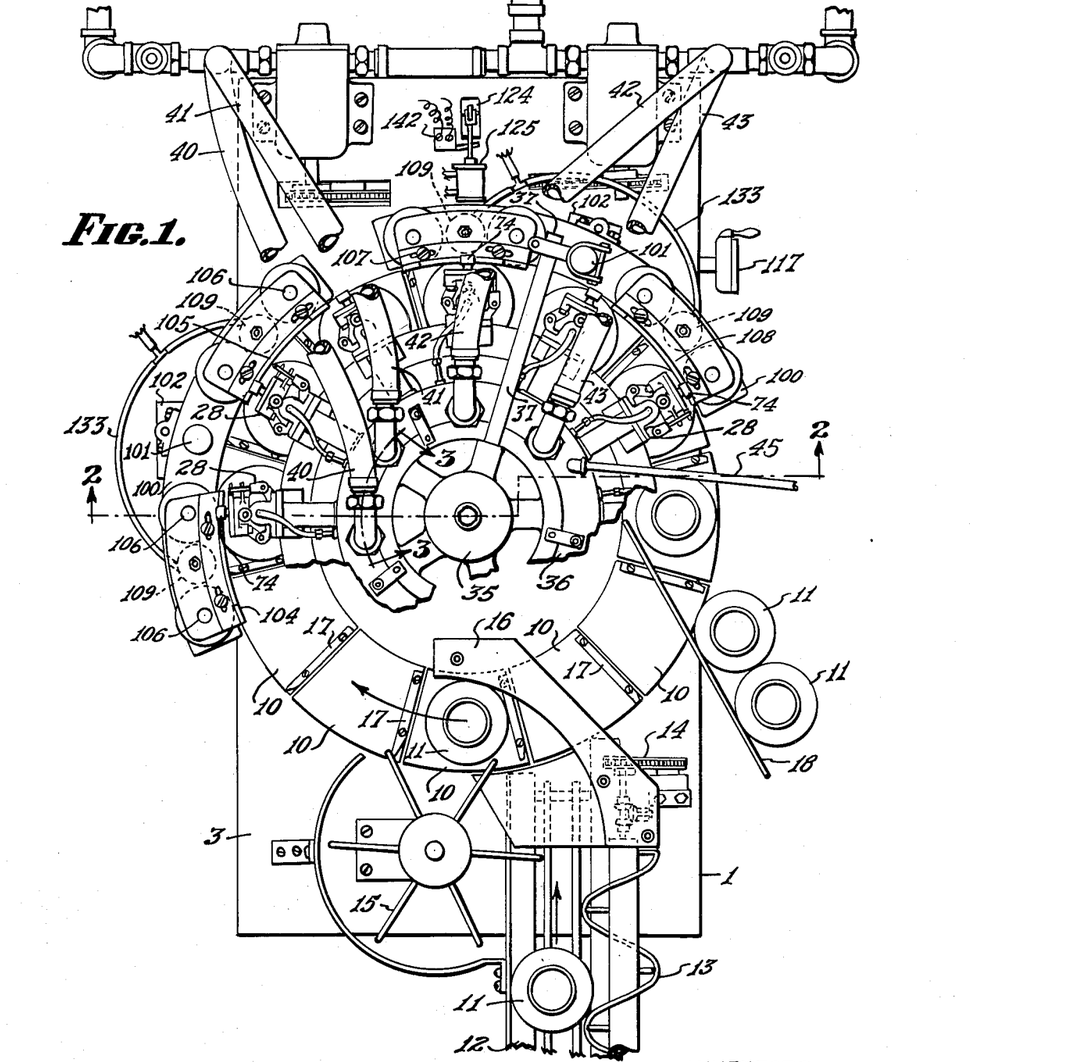
Figure 1 is a plan view of our machine with portions thereof cut away.
Figures 2, 3:
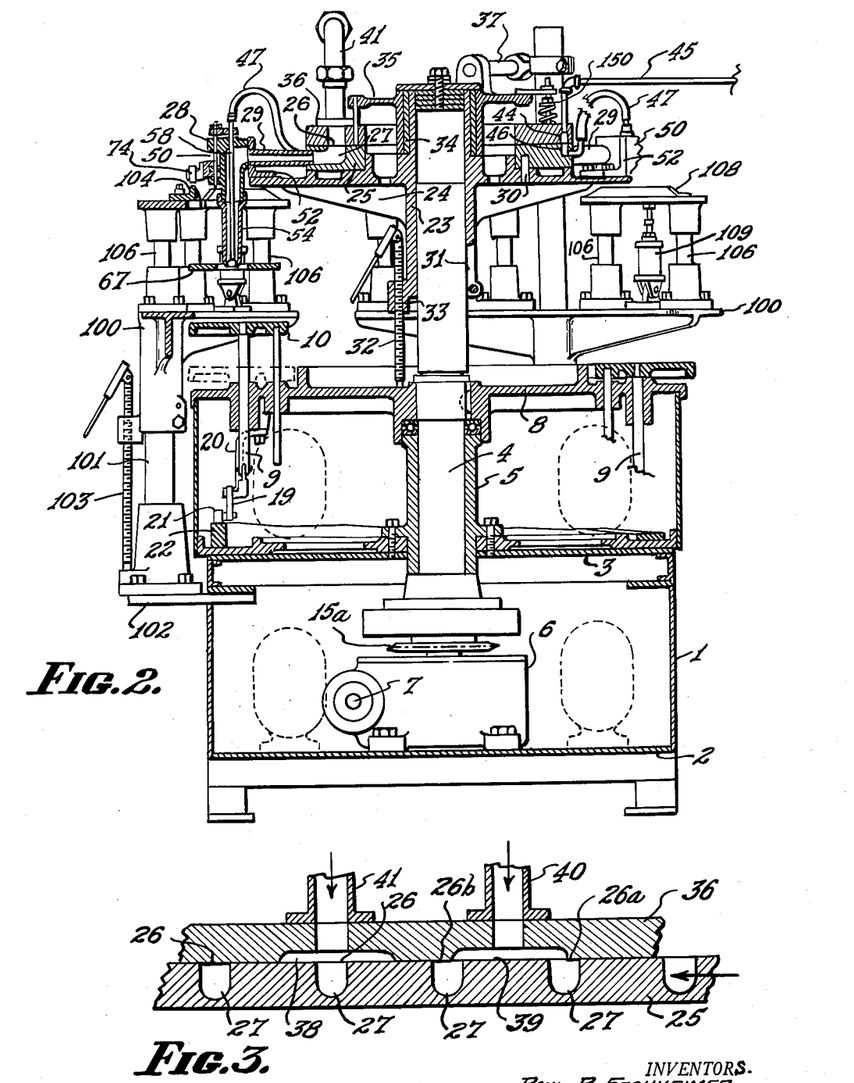
Figure 2 is a vertical sectional view taken along the line 2—2 of Figure 1.
Figure 3 is a vertical sectional view taken along the line 3—3 of Figure 1.

In the exemplary machine seen best in Figures 1 and 2, which has a base 1 comprising a bottom 2 and a top 3, a vertical shaft 4 is journaled in a support 5 mounted on the top 3 of the base 1. The vertical shaft 4 is arranged to be driven through gear box 6 connected by drive shaft 7 to a prime mover (not shown). A table 8 is keyed to the shaft 4 so as to be rotatable therewith and, in the exemplary embodiment, rods 9 are mounted in the table so as to be vertically slidable relative to it. These rods carry platform elements 10 to receive the containers 11; and the table 8 is recessed as illustrated to accept these platforms and to provide a smooth surface when the platforms are in their lowermost position for the acceptance and discharge of the containers.

The containers are brought to the machine by a conveyor 12 supported on the base 1, the containers being moved along the conveyor by means of a worm drive 13 driven in synchronism with the shaft 4 by means of the gear and chain drive indicated generally at 14. A star wheel or its equivalent 15 driven from sprocket 15a (Figure 2) in synchronism with shaft 4 is provided, coacting with a curved sweep or guide 16 to move the containers from the conveyor 12 to the table 8, these elements acting, as will be readily understood by the skilled worker in the art, to position a container upon each of the platform elements 10. The platform elements may be provided with guides 17 to position the containers upon the platforms.

The containers are discharged from the platforms by means of a sweep 18 which serves to direct the containers to another conveyor (not shown) for delivery to a capping device or the like. If desired, a star wheel may be employed in conjunction with the sweep 18 to facilitate removal of the containers from the platforms.

The lower ends of the rods 9 are pivotally connected to lifter arms 19 which in turn are pivoted to brackets 20 secured to table 8. The lifter arms 19 carry cam rollers 21 which engage a cam element 22. The cam element is shaped in such a way as, at the proper point in the rotation of the table 8, to raise the platforms and the containers resting thereon so as to juxtapose them to the pouring spouts, and then to lower them in stages until the containers are returned to the lowermost position for discharge from the platforms. The cam element is configured in the manner diagrammatically illustrated in Figure 16, which will be explained more fully hereinafter. It will be understood that the precise mechanism herein disclosed for lifting and lowering the platforms 10 forms no part of our present invention and other arrangements may readily be substituted without departing from the scope of our invention.

The filling head

Near its upper end, the shaft 4 carries a sleeve 23 having an integrally formed platform 24 which supports rotary head element 25. This head element is provided with radially disposed inlet ports 26 communicating with horizontal bores 27. The filling spouts 28 are fastened to the platform 24 and have openings therein for communication with the bores 27 in the rotary head. In the embodiment illustrated, tubular extensions 29 serve to connect the opening in the filling spouts with the horizontal bores in the rotary head.

The rotary head 25 is secured to the platform 24 by means of pin 30 so as to be rotatable therewith. The sleeve 23 is slidable on the shaft 4, but is non-rotatably related to it by means of a clamp 31. For filling different containers of different sizes it is desirable to raise and lower the head. This is accomplished by means of threaded adjustment rod 32 which passes through the threaded collar 33 fixed to the sleeve 23. The lower end of the adjustment rod 32 rests on the table 8 so as to move the rotary filling element relative to the table.

The upper end of the sleeve 23 is provided with a bearing sleeve 34 and a spider 35 which supports the stationary head 36. The spider 35 and the stationary head 36 are held against rotation by an arm 37 which engages the spider 35 and secures it to a fixed support on the machine base.

The stationary filling head 36 is provided in its under surface with four elongated outlet ports, two of which are illustrated in Figure 3 and designated by reference numerals 38 and 39. The under surface of the stationary head 36 and the top surface of the rotary head 25 are in close and liquid-tight contact. As the rotary head moves relative to the stationary head, the inlet ports 26 are brought serially into communication with the outlet ports. The outlet ports 38 and 39 are supplied with filling material under pressure through conduits 40 and 41. Since there are preferably four elongated outlet ports, additional conduits 42 and 43, as seen in Figure 1, will be provided to supply filling material to the remaining two outlet ports.

The arrangement of the outlet ports is such that each of the ports is adapted to deliver a metered increment of filling material to each of the filling spouts. Filling by increments is preferred to introducing the entire charge through a single port, since the speed of operation of the filling machine can be materially increased without unduly increasing the rate of flow of the filling material itself, thereby eliminating undue splashing and turbulence of the filling material.

Referring again to Figure 3 of the drawings, it will be noted that the length of the outlet ports in the stationary head is such that the filling material supplied to each port will be fed primarily to one of the inlet ports in the rotary head at a time. However, to avoid building up pressure in the supply conduits, the outlet ports are of a length such that as one of the inlet ports 26 is closed, the next adjacent inlet port will be opened. Thus, as the outlet port 39 begins to close inlet port 26a (by passing beyond it), the outlet port simultaneously begins to open inlet port 26b, and the combined open areas of the inlet ports 26a and 26b, when the outlet port 39 is in a position intermediate the two ports, as in Figure 3, is equal to the full area of either of the inlet ports. Thus, irrespective of the position of the outlet ports, the pressure of the filling material in the head will be maintained substantially constant, thereby assuring the delivery of an equal increment of filling material to each of the inlet ports.

While we have indicated a preference for introducing equal increments of filling material through each of the inlet ports, it is within the spirit of our invention to provide a greater or lesser number of ports and to change the relative amount of material fed through each port. This can be done in ways familar to the skilled worker in the art, as by making appropriate changes in the rate of flow of filling material through the various ports. It is also within the spirit of our invention to introduce into each container measured quantities of different substances through the several ports. However, where each container is to be filled with a single substance, the initial adjustment of the pumps supplying filling material to the ports will be made in accordance with the character of the material to be filled, and the pumps will be synchronized to supply filling material at an equal rate. With some materials, however, it is preferable to fill slowly at first and then continue the filling operation very much more rapidly. With other materials the reverse of this condition is preferable, and suitable adjustments may be made in the rate of flow of the material to the various ports.

In some instances it may be desired to introduce into each container a small amount of some additional ingredient. For example, where the containers are to be filled with anti-freeze, it may be desired to add a small quantity of rust inhibitor to each container. This may be accomplished by means of a separate, relatively small outlet port 44 in the stationary head 36 lying on a radius different from the radius of the main outlet ports and fed by a supply line 45. Correspondingly small inlet ports 46 are provided in the rotary head 25 on a separate radius therein for contact with the port 44 to deliver the additional material to the filling spouts through the tubes 47. Of course, where the additional ingredient constitutes a sizable portion of the charge introduced into each container, one or more of the outlet ports may be employed to introduce the added ingredient, as explained above. However, where but a small quantity of added ingredient is required, we find that the supplemental inlet and outlet ports on a separate radius is preferable.

*Filling spout mechanism*

Referring now to Figures 6 through 11 of the drawings, the filling spouts 28 each comprise a body 50 having an opening 51 therein adapted to receive the end of a tubular element 29 extending outwardly from the horizontal bore 27 of the rotary filling head. As seen in Figure 2 the outer end of the tubular element 29 and the filling spout 28 may be supported on a bracket 52 secured to the platform 24. The body 50 has a vertical bore 53 communicating with the opening 51 and opening downwardly through the bottom of the body. A filling stem 54 extends downwardly from the vertical bore and is secured to the body 50 by means of a threaded collar 55. The lower end of the filling stem 54 is provided with a valve seat 56, and a valve element 57 is provided on the end of filling tube 58, the filling tube being movable axially to unseat the valve element 57. The filling tube 58 thus serves both as a valve lifting element and also as the means whereby filling material passing through supply line 45 and tubes 47 may be introduced into the containers. To this end, the lower end of the filling tube 58 opens at 59 through the valve element 57 and the opposite end of the filling tube extends upwardly through an opening 60 in the top of the body 50. The opening 60 is closed by means of a plug 61 having a gasketed opening 62 therein through which the upper end of the filling tube passes. The upper end of the filling tube is connected to the free end of the tube 47.

The body 50 has ears 63 and 64 in which are journaled vertically slidable rods 65 and 66. A plate 67, which may be thought of as a centering bell, is carried by the rods 65 and 66, and the plate 67 is adapted to be contacted and lifted by a container presented to the filling spout. The plate 67 has a centrally disposed opening 68 therein to permit the plate to be moved upwardly relative to the filling stem 54, as in the manner illustrated in dotted lines in Figure 7. An extension 69 of the ear 64 slidably journals a third rod 70 which is supported on and moved by the plate 67. Suitable stops 71 and 72 are provided on the upper ends of the rods 65 and 66 to limit their downward movement.

The mechanism for actuating the valve element 57 comprises a rocker arm 73 carrying cam following roller 74. The rocker arm 73 is pivotally supported on a shell 75 extending outwardly from the body of the filling spout. A spring 76 biases the rocker arm in the clockwise direction, the movement of the rocker arm being limited by a stop 77. A second rocker arm 78 is also pivoted to the shaft 75 and biased in the clockwise direction by means of spring 79.

The rocker arm 78 has an extension 80 on one end thereof. The extension 80 has a bore 81 therein (see Figure 8), and a plug 82 carrying pin 83 is slidably fitted in the bore 81. A spring 84 biases the plug 82 to the position illustrated in Figure 8 of the drawings, the biasing movement of the spring being limited by the stop 85 which prevents the plug 82 from being expelled completely from the bore. The plug 82 has an inclined lower surface which is adapted to be contacted by the inclined upper surface of rod 70. Thus, when the plate 67 is in the position illustrated in Figure 6 of the drawings, the rod 70 will be in the position illustrated in Figure 8. However, upon association of a container with the plate 67 and the upward movement of the container by the platform 10, the plate 67 will be lifted and will lift the rod 70 with it. The upward movement of the rod 70 will in turn force the plug 82 to move into the bore 81, thereby causing the pin 83 to be projected into the opening 85 in the rocker arm 73, thereby effectively locking the two rocker arms together for joint movement. It will be apparent that the two rocker arms will be connected together for joint movement only when a container is present on the platform 10 and the platform moved upwardly so as to raise the plate 67 to cause engagement of the pin 83 within the opening 85.

Figures 7, 10, 11:
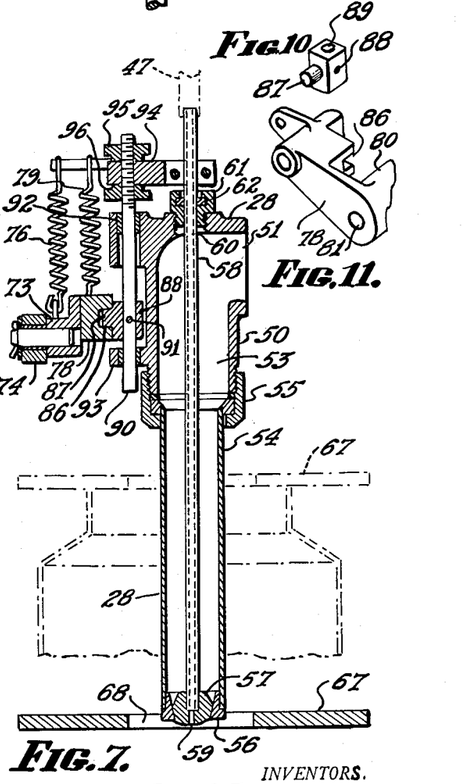
Figure 7 is a vertical sectional view taken along the line 7—7 of Figure 6.
Figure 10 is a perspective view of one of the parts of the filling spout mechanism.
Figure 11 is a partial perspective view of a rocker arm of the filling spout mechanism.
Figure 8:
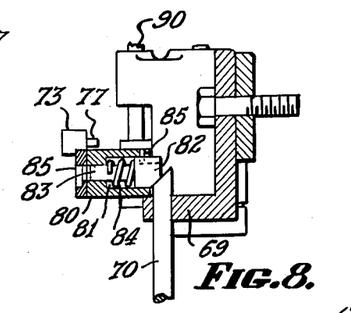
Figure 8 is a vertical sectional view taken along the line 8—8 of Figure 6.
Figure 9:
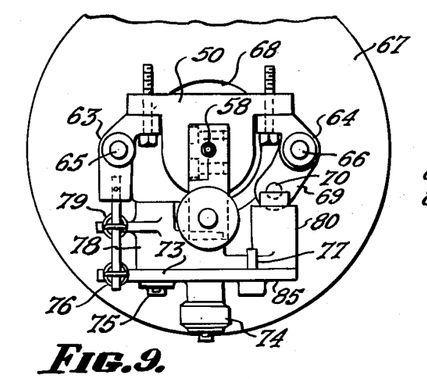
Figure 9 is a partial plan view of the filling spout mechanism illustrated in Figure 6.

Referring now to Figure 7 of the drawings, the rocker arm 78 is provided with a slot 86 which receives a stud 87 carried by block 88. The block 88 (Fig. 10) has a vertical bore 89 extending therethrough into which actuating rod 90 is pinned at 91. The actuating rod 90 is journaled in projections or ears 92 and 93 carried on body 50, and the upper end of the rod 90 is provided with a link 94 connecting it to the filling tube 58. The upper end of the rod 90 is preferably threaded and provided with adjustment screws 95 and 96.

In the operation of the filling spout mechanism, cam tracks are provided for contact by the cam roller 74 to move the rocker arm 73 in a counterclockwise direction. Where no container is present beneath the filling spout, the plate 67 will not have been raised and the rod 70 will not have moved the pin 83 to connect the rocker arms 73 and 78 together. Consequently, the rocker arm 73 will move by itself, and the filling spout valve will not be opened. However, when a container is properly positioned beneath the filling spout and the container juxtaposed to the filling spout, the pin 83 will be engaged in the opening 85 in the rocker arm 73 and the rocker arm 78 will be caused to move in a counterclockwise direction together with the rocker arm 73. The movement of the rocker arm 78 in the manner indicated will cause an upward movement of the actuating rod 90, which in turn will cause upward movement of the filling tube 58, thereby unseating the valve element 57 to permit the filling material to be discharged into the container.

*Cam track supporting and lifting mechanism*

The cam tracks for actuating the valve mechanism of the filling spouts are supported on platforms 100 slidably mounted on columns 101 which in turn are supported on brackets 102 fixed to the base of the machine. The platforms are slidably mounted on the columns and are adjustable by means of threaded adjustment rods 103 in much the same manner as the platform 24 is made adjustable relative to table 8.

Figure 12:
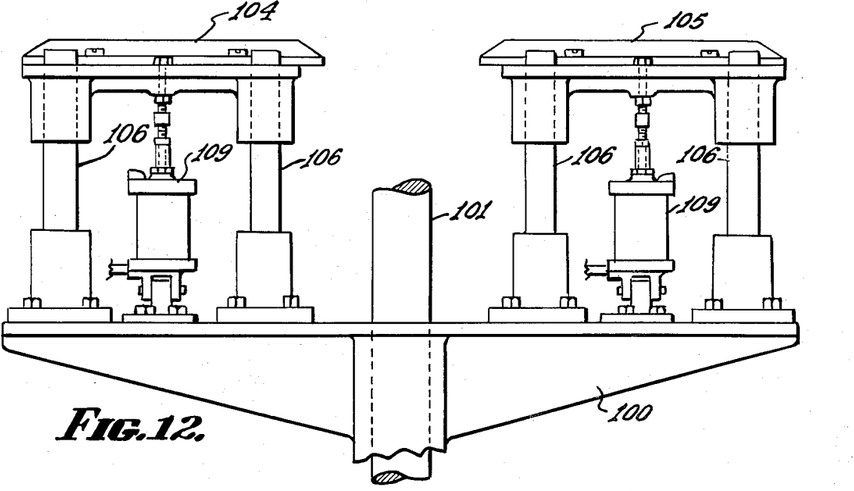
Figure 12 is an elevational view of the supporting and lifting mechanism for the filling spout cam tracks.

Referring now to Figure 12 of the drawings, each of the platforms 100 supports a pair of spaced apart cam tracks 104 and 105, the cam tracks each being slidably journaled on pairs of vertical posts 106. There will be four such cam tracks, one in conjunction with each of the outlet ports, such as the ports 38 and 39. The cam tracks for the remaining two outlet ports are identified in Figure 1 of the drawings at 107 and 108. The cam tracks are brought into and out of operative relationship with the cam rollers 74 of the filling spouts by means of pneumatic cylinders 109. The platforms 100 are initially adjusted relative to the platform 24 and the filling spouts 28 by means of adjustment rods 103 so that the cam tracks, when in their raised or operative position, will contacts the cam rollers 74. The cam tracks are, however, arranged to be lowered from the operative to an inoperative position by means of the pneumatic cylinders, thereby permitting the filling head to rotate without actuation of the filling spout mechanism. The manner in which the pneumatic cylinders are controlled will be axplained in conjunction with the description of the automatic control system.

It has already been indicated that the lowering of the containers relative to the filling spouts is accomplished in stages. Now that the operation of the filling head, the filling spouts, and the cam track mechanism has been explained, reference is again made to Figure 16 of the drawings for an explanation of the configuration of the cam element for lowering the containers in stages. As seen in the drawing, the cam element 22 is configured so as to initially raise the platform 10, through rod 20, to a position wherein the filling spout enters the container for the introduction therein of the initial increment of filling material. At the top of the initial rise, the cam element levels off for a short distance and then inclines downwardly toward a second level. As seen in the drawing, the first inclined portion of the cam element is marked "1st fill," and the configuration of the cam element is such that the downwardly inclined section of the cam will be reached by the rod 20 coincident with the opening of the first outline port in the filling head and the actuation of the filling spout valve mechanism by the first cam track, so that during the introduction of the first increment of filling material into the container, the container will be moving downwardly as the level of the filling material in the container rises. As already indicated, the relative positioning of the filling spout and container will be such that the lower end or tip of the filling spout will be in contact with or slightly above the level of the filling material in the container.

Figures 13, 14, 15, 16:
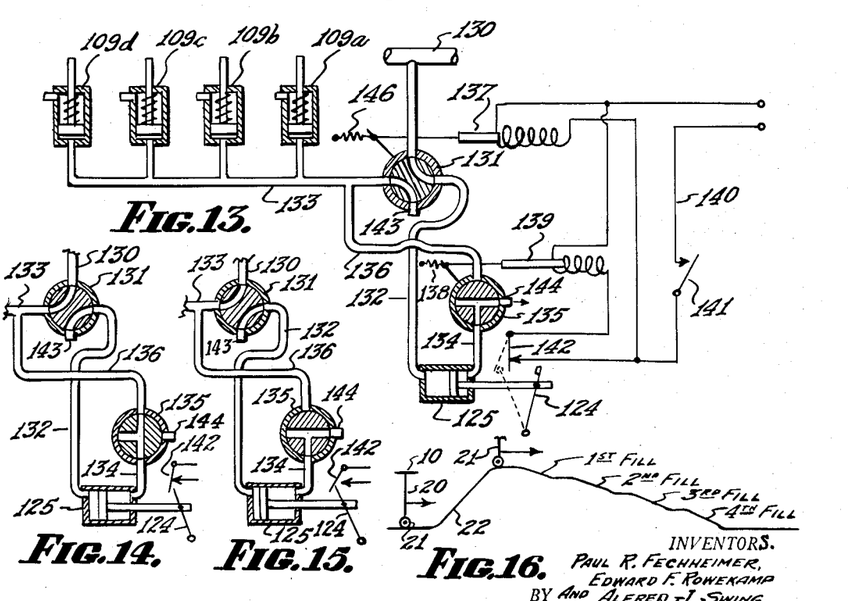
Figure 13 is a diagrammatic view of the control system for the clutch pump and cam track lifting mechanism.
Figure 14 is a diagrammatic view illustrating the starting position of the valve members illustrated in Figure 13.
Figure 15 is a diagrammatic view illustrating the running position of the valve member illustrated in Figure 13.
Figure 16 is also a diagrammatical view illustrating the construction of the cam element for lifting the platforms on which the containers are placed.

The first inclined portion of the cam element terminates at a point coincident with the closing of the first outlet port and the filling spout, whereupon the cam element again levels off for a short distance so as to arrest the downward movement of the container. The container is thus held stationary during the interval between the closing of the first outlet port and the filling spout and the opening of the next adjacent filling spout. The introduction of the second increment of filling material will occur during movement of the rod 20 along the second inclined portion of the cam element, as identified in the drawings as "2nd fill" and, as before, the container will be lowered in synchronism with the rise of the level of filling material in the container.

As will be evident, four filling stages will be provided in all, one corresponding to each of the four outlet ports in the filling head. In this fashion the lower end of the filling spout is maintained in contact with or slightly above the level of the filling material in the container at all times and at no time is the filling spout far enough removed from the level of the filling material so as to cause splashing or turbulence of the material or the formation of air pockets in the container. This arrangement is also advantageous in that it is often necessary to lower the container at the conclusion of filling in order to attenuate and break the string of material which may connect the spout and the fluid surface in the container.

*Filling material supply*

Figure 4:
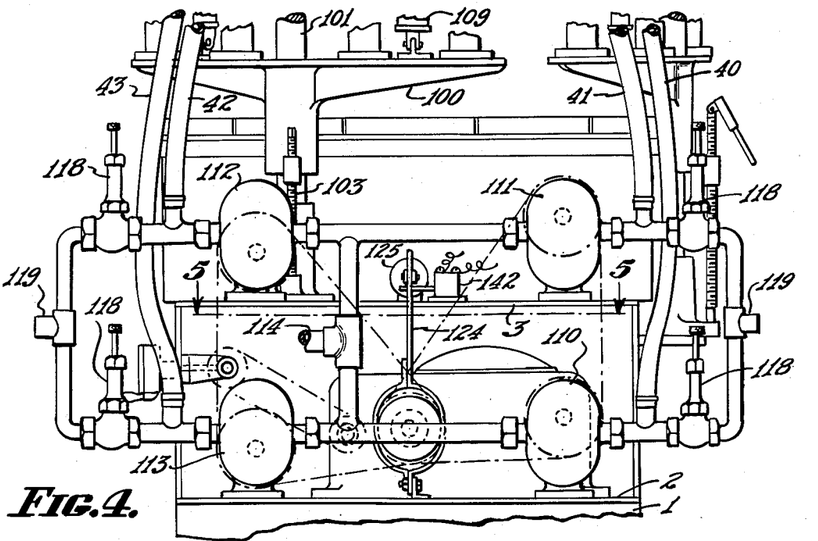
Figure 4 is a partial elevational view of our machine.
Figure 5:
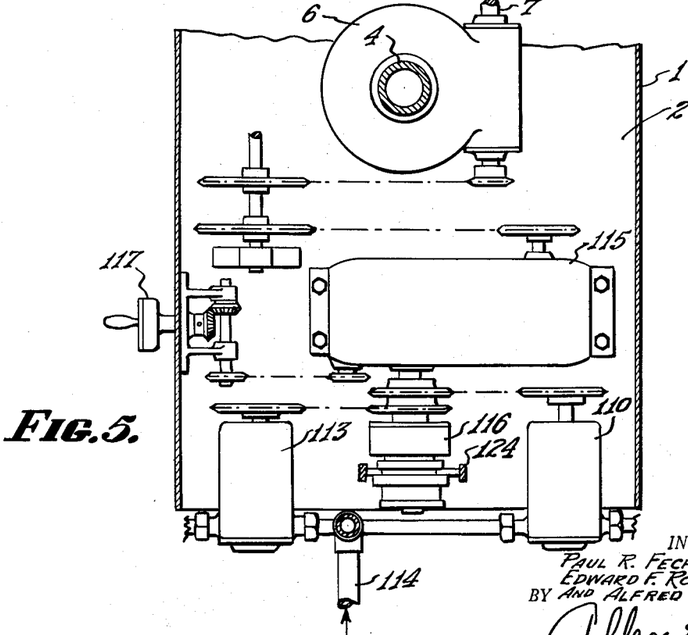
Figure 5 is a sectional view taken along the line 5—5 of Figure 4.
Figure 6:
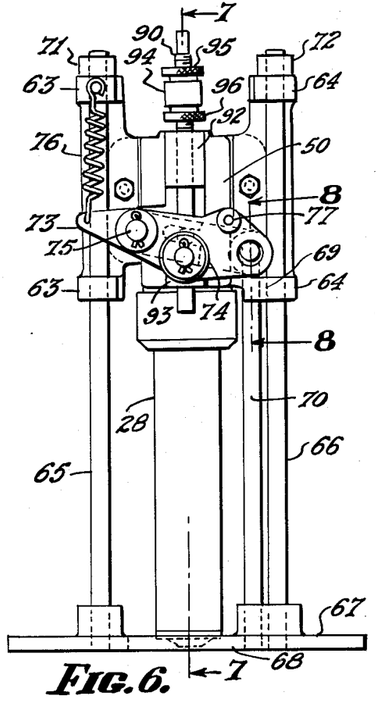
Figure 6 is an elevational view of the filling spout mechanism.

As already indicated, filling material is supplied to the outlet ports in the stationary filling head through conduits 40, 41, 42 and 43. Referring now to Figure 4 of the drawings, each of these conduits is supplied by a separate pump, the pumps being identified at 110, 111, 112 and 113. Each of the pumps is fed from a supply tank (not shown) through conduit 114. In the preferred form of our invention, the pumps are driven from drive shaft 7 through variable speed transmission 115 and clutch 116, suitable sprocket and chain driving means being provided between drive shaft 7 and the variable speed transmission 115, and between the clutch 116 and the pumps. The variable speed transmission may be conveniently adjusted by means of hand wheel 117.

The variable speed transmission provides for accurate and uniform control of the pumps to regulate the flow of filling material to the filling head; and the clutch 116 enables the operator to start and stop the pumps irrespective of the rotation of the shaft 4 which moves the table 8 and the rotary head element. Where the filling material supplied to the several conduits is to be pumped at different rates of flow, alterations in the drive means for the pumps will be necessary and additional transmission or gear reduction means may be provided as needed.

Since it is contemplated, in the preferred embodiment of our invention, that each of the pumps will supply an equal increment of filling material under substantially constant pressure, means must be provided to prevent the building up of additional pressure in any one of the conduits 40, 41, 42 or 43 occasioned by the failure of the filling spouts to open in the absence of containers beneath them. To this end an adjustable pressure relief valve 118 is provided in communication with each of the conduits. The pressure relief valves are so adjusted that any predetermined increase in pressure in a given conduit will result in the opening of the associated relief valve and the diversion of the flow from the pump through one of the conduits 119 which returns the diverted filling material to the central supply tank. As soon as pressure returns to normal, the spring loaded relief valve 118 will again close and the filling material will again flow through the conduit in the usual manner.

Figure 17:
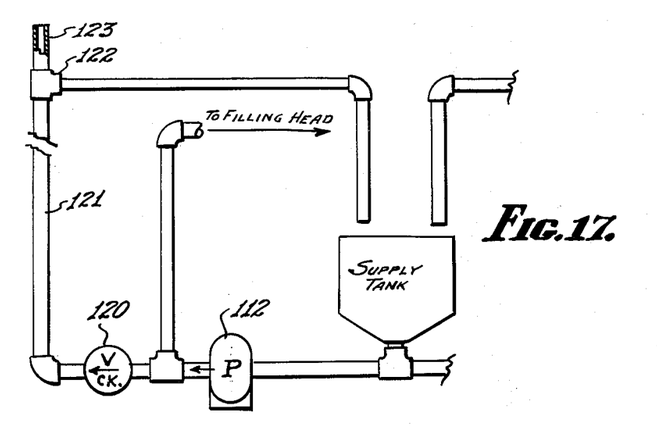
Figure 17 is a partial elevational view illustrating an alternative pressure relief system for filling material supplied to the filling head by the pumps.

In Figure 17 of the drawings, we have illustrated an alternative system for relieving excess pressure. In this embodiment, the relief valves are replaced by check valves, such as the valve 120, and a stand pipe 121. The stand pipe carries a drain opening 122 at the desired height so as to give pressure against the check valve slightly in excess of that required for normal filling. If a filling spout fails to open, then the flow from the pump which would normally go to the filling head is diverted through the check valve to the stand pipe. Eventually the liquid level in the stand pipe will build up to the height in the drain line, and any further flow into the stand pipe will return through the drain line to the source of supply. Of course, when the filling spouts are opening properly, the pressure of the pump will be less than the pressure on the outlet side of the check valve, and the check valve will be closed and draining of the liquid from the stand pipe back into the filling line will be prevented. The upper end of the stand pipe is open, as at 123, or at least vented, in order to prevent syphoning of the liquid into the supply tank.

The clutch 116 which controls the operation of the pumps is actuated by means of a forked clutch lever 124 (see Figures 1 and 4) and the clutch lever is actuated by means of a pneumatic cylinder 125 which is a part of the automatic control system for the filling machine. The pneumatic cylinder 125 serves to throw the clutch lever from one position to another so as to engage or disengage the clutch.

*Automatic control system*

The automatic control system for the machine can be best understood by reference to Figures 13, 14, and 15 of the drawings which diagrammatically illustrate the control system. Referring first to Figure 13, which illustrates the control system in the off or rest position, the reference numerals 109a, 109b, 109c, and 109d represent the spring biased pneumatic cylinders for lifting the cam tracks 104, 105, 107 and 108 to the operative position, and the reference numerals 124 and 125 again represent the clutch lever and the pneumatic cylinder for actuating the clutch lever, respectively. The reference numeral 130 indicates an air supply line for supplying compressed air to one port of the four-way valve 131. A line 132 connects a second port of the valve 131 to one end of cylinder 125. Line 133 connects a third port of valve 131 with the four cylinders 109a, 109b, 109c and 109d, the line 133 also being indicated in Figure 1 of the drawings. A line 134 connects the opposite end of cylinder 125 with the three-way valve 135, and a line 136 connects the line 133 to the valve 135. The valve 131 is normally biased to the position illustrated in Figure 13 by means of a spring 146, and a solenoid 137 is provided to turn the valve to its other position. Similarly, a spring 138 biases the valve 135 to the position illustrated in Figure 13, and the solenoid 139 serves to turn this valve. Suitable circuit means 140 are provided to energize the solenoids 137 and 139, controlled by the off-on switch 141. A limit switch 142 is also provided in that portion of the circuit energizing solenoid 139.

When the switch 141 is in the "off" position, compressed air passing from air line 130 into valve 131 is directed through line 132 to cylinder 125 which forces the clutch lever arm 124 to the disengaged position. When valve 131 is in the position illustrated in Figure 13, the line 133 which lifts cam tracks 109a, 109b, 109c and 109d is vented through vent port 143 of valve 131. In the same manner, line 134 on the opposite end of cylinder 125 is vented through exhaust port 144 of valve 135. Thus, when the control system is in the rest position, the pumps are not operating nor are the cam tracks elevated for contact with the cam rollers of the filling spouts; and even if the filling head of the machine is rotating, no filling action will occur.

When it is desired to start the filling operation, the switch 141 is moved to the "on" position, whereupon the circuit means 140 acts to energize the solenoids 137 and 139 which in turn move the valves 131 and 135 to the positions illustrated in Figure 14 of the drawings, which is the starting position. When the valve elements are in the starting position, air pressure from the air line 130 is fed through line 133 to the cylinders 109a, 109b, 109c and 109d, causing the cylinders to elevate the cam tracks to the operative position. Concurrently, the valve 135 acts to connect lines 134 and 136, thereby applying pressure to the opposite side of cylinder 125, line 132 in the meantime being vented through vent 143 of valve 131. The pressure against the opposite side of cylinder 125 causes the clutch lever 124 to be thrown to the clutch engaging position, thereby actuating the pumps and starting the flow of filling material to the outlet ports in the filling head.

We have found it undesirable to maintain positive pressure on the clutch lever 124 during the operation of the machine since such pressure results in excessive wearing of the clutch parts. Since the clutch, when moved to engaged position, will remain there until positive pressure is applied to disengage it, we have provided means for releasing the pressure on the clutch following movement of the clutch lever to the position illustrated in Figure 14. To this end, the limit switch 142 is so arranged that it will be opened by the clutch lever when the clutch reaches the fully engaged position. The opening of the limit switch will interrupt that portion of the circuit 140 supplying power to solenoid 139, and the solenoid will be deenergized, thereby permitting the spring 138 to return the valve 135 to its original position. The control system thus assumes the condition illustrated in Figure 15, which is the running position of the control system. With the return of the valve 135 to its initial position, the line 134 is vented through exhaust port 144 and hence the pressure in cylinder 125 is released, thereby releasing the pressure on clutch lever 124. This action in no way affects the valve 131 and air pressure is still supplied to the cam track lifting cylinders to maintain them in the raised condition.

It will be evident that the filling operations may be stopped simply by throwing the switch 144 to the "off" position, thereby causing the solenoid 137 to be deenergized and the valve 131 returned to the position illustrated in Figure 13, in which position the cam track lifting cylinders will be vented through vent port 143, and the spring loaded cylinders will be returned to their lowermost position, while pressure is again applied to cylinder 125 through line 132 to throw the clutch lever to the "off" position to simultaneously stop the pumps.

It will be understood that the switch 141 may be coupled with circuit means controlling the prime mover for the drive shaft 7, thereby providing a single control for the entire machine. However, we have found it desirable to have a separate switch for the control system just described so that the filling of the containers may be controlled independently of the drive mechanism for the filling head and container moving means.

With the pneumatic control system just described, it is also possible to accurately control the pressure between the rotary head element 25 and the stationary head element 36. It will be understood that when filling material is flowing through the filling head elements it is necessary for the head elements to be urged toward each other with sufficient pressure to hold them in intimate contact so as to prevent or minimize leakage between them. Ordinarily one of the head elements is spring loaded, as by means of the spring elements 150, seen in Figure 2, which act to force the head elements together under pressure sufficient to overcome the pressure of the filling material, which tends to separate the head elements. Unless the head elements are made of material with self lubricating qualities, there is no film of lubrication between them excepting when the product is flowing, at which time a small quantity of the filling material itself seeps between the head elements and acts as a lubricant. However, when the filling material is flowing through the head elements, its pressure tends to separate the head elements with a force approaching that of the load applied by the springs so that there is either a film of lubricant separating the head elements, or, at least, the load causing metal to metal contact is substantially reduced when the product is flowing. However, if the machine runs idle, as when the pump mechanism is disengaged, the excessive load applied by the springs may cause galling or scoring of the mating surfaces of the head elements. To avoid this condition, a pneumatic cylinder may be provided which will automatically release the load on the head elements when the product is not flowing.

Figure 18:
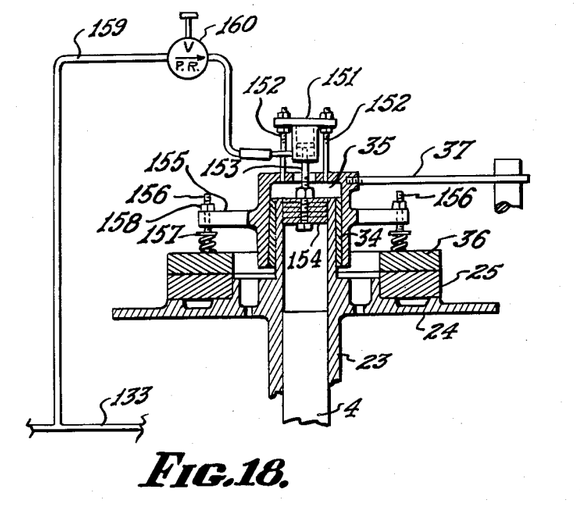
Figure 18 is in part a vertical section and diagrammatical view illustrating a pneumatic pressure system for applying pressure to the stationary portion of the filling head.

Referring now to Figure 18 of the drawings, an air cylinder 151 is mounted on the spider 35 which carries the stationary head element 36, the air cylinder 151 being mounted on the support by means of suitable rods 152. The piston 153 of the air cylinder 151 is rotatably journaled in a plug 154 fixed in the top of sleeve 23, which, it will be remembered, rotates with vertical shaft 4. The spider 35 includes arms 155 having adjustment rods 156 for contact with the head element 36, and springs 157 surround the adjustment rods. Suitable adjustment screws 158 are provided on the rods 156 to adjust the compression of the springs.

Air pressure is applied to the cylinder 151 by means of air line 159 which, preferably, is connected to air line 133 of the automatic control system. Thus, when the air cylinders 109 are actuated to lift the cam tracks for the filling spout mechanism, air pressure will be simultaneously applied to the cylinder 151. The air pressure applied to the cylinder 151 would normally cause the piston to move upwardly relative to the cylinder. However, since the piston is secured to the plug 154, which is itself secured against axial movement, the cylinder 151 is caused to move downwardly thereby applying downwardly directed pressure through rods 152 against the spider 35 which in turn transmits the pressure to the stationary head element 36 through the adjustment rods 156. The pressure in the air cylinder 151 may be controlled by a regulating valve 160 so that adjustment of the pressure between the head elements may be conveniently made, even while the machine is running, in order to compensate for the pressure of the filling material.

It will also be evident that the arrangement is such that upon cessation of the filling operation, the air pressure supplied to the air cylinder 151 through line 133 will be cut off, and the pressure exerted by the air cylinder on the stationary head element will be released. It is also possible by means of this construction to adjust the pressure applied to the fixed head by the springs 157. When the filling material is flowing, the pressure exerted by the product is applied between the head elements at the points where the outlet ports in the fixed head are located. It is, therefore, advisable to increase the spring pressure at those points. By utilizing the individual compression springs 157, individual adjustment is provided in the critical areas.

Figure 19:
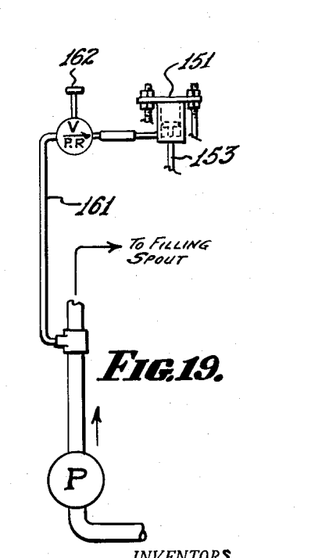
Figure 19 is a diagrammatical view illustrative of an alternative mechanism for applying pressure to the stationary portion of the filling head wherein the pressure is applied by the filling material itself.

It is also within the spirit of our invention to use the filling material itself to actuate the cylinder 151. An arrangement for accomplishing this is diagrammatically illustrated in Figure 19, wherein the reference numeral 151 again illustrates a cylinder for applying pressure to the stationary head element 36. In this instance, however, the line 161 is connected to one of the conduits supplying filling material to the filling head, and the filling material itself, which is under pressure, will be utilized to actuate the piston 153. With this arrangement, the pressure or load to be supplied to the cylinder 151 will be in direct proportion to the actual pressure of the filling material itself. Of course, as before, a regulating valve 162 may be provided in the line 161 for further adjustment of the fluid pressure.

Modifications may, of course, be made in our invention without departing from the spirit of it. Several modifications have been specifically referred to in the specifications, and others will be apparent to the skilled worker in the art, and we do not intend our invention to be limited other than in the manner set forth in the claims which follow. For example, while we have described a control system utilizing pneumatic cylinders, it will be apparent that other fluid pressure means, such as a hydraulic system, may be employed.

Having thus described our invention in an exemplary embodiment, what we claim as new and desire to secure by Letters Patent is:

1. In a filling machine, a filling head comprising a stationary head element and a rotary head element in face-to-face contacting relation, filling spouts connected to said rotary filling head element for rotation therewith, container moving means moving synchronously with said filling spouts, a plurality of outlet ports in said stationary head element each connected by a conduit to a separate source of supply, inlet ports in said rotary head element for connecting said filling spouts serially to said outlet ports, the size of said inlet ports relative to said outlet ports being such that adjacent inlet ports will be jointly connected to a single outlet port during a substantial portion of the time each of the inlet ports is in communication with a given outlet port, valve means in each of said filling spouts for controlling the delivery of filling material therethrough, valve actuating means for opening and closing said filling spouts during the connection of said outlet ports to said inlet ports, said valve actuating means acting to open said filling spouts and meter therethrough predetermined increments of filling material, said container moving means including lifting platforms for juxtaposing containers to said filling spouts, each of said filling spouts carrying a member adapted to be contacted and moved upwardly by a container brought into contact therewith, a rod carried by said member and slidable relative to said filling spout, said filling spout including means actuated by said rod for effecting an operative connection between said valve means and said valve actuating means.

2. The filling machine claimed in claim 1 wherein said valve means includes a valve element, a first rocker arm operatively connected to said valve element, and a second rocker arm for contact with said valve actuating means, and wherein the means actuated by said rod for effecting an operative connection between said valve means and said valve actuating means comprises a pin carried by said first rocker arm and adapted to be slidably moved by said rod into an opening in said second arm, whereby to operatively connect said rocker arms for joint movement.

3. The filling machine claimed in claim 2 wherein said slidable pin is spring biased to a position wherein it is normally out of contact with the opening of the said second rocker arm.

4. In a filling machine, a filling head comprising a stationary head element and a rotary head element in face-to-face contacting relation, filling spouts connected to said rotary filling head element for rotation therewith, container moving means moving synchronously with said filling spout, drive means for starting and stopping said machine, a plurality of outlet ports in said stationary head element each connected by a conduit to a separate source of supply, inlet ports in said rotary head element for connecting said filling spouts serially to said outlet ports, the size of said inlet ports relative to said outlet ports being such that adjacent inlet ports will be jointly connected to a single outlet port during a substantial portion of the time each of the inlet ports is in communication with a given outlet port, valve means in each of said filling spouts for controlling the delivery of filling material therethrough, valve actuating means for opening and closing said filling spouts during the connection of said outlet ports to said inlet ports, said valve actuating means acting to open said filling spouts and meter therethrough predetermined increments of filling material, means for preventing the opening of each filling spout in the absence of a container thereunder, and pressure relief means in said conduit for diverting the flow of filling material therethrough should said filling spouts fail to open.

5. The filling machine claimed in claim 4 wherein said pressure relief means comprises a pressure relief valve, and wherein a branch conduit is connected to said pressure relief valve for returning filling material diverted through said valve to said source of supply.

6. The filling machine claimed in claim 4 wherein said pressure relief means comprises a spring loaded valve adjusted to be opened by pressure in the conduit slightly in excess of the normal pressure of the filling material as supplied to the filling head.

7. The filling machine claimed in claim 4 wherein said pressure relief means comprises a check valve, and wherein the discharge side of said check valve is connected to a stand pipe having a height sufficient to provide pressure against said valve slightly in excess of the normal pressure of the filling material pumped through said conduit.

8. The filling machine claimed in claim 4 wherein said stand pipe includes a branch conduit arranged to return excess filling material diverted through said stand pipe to said source of supply.

9. In a filling machine, the combination of means for moving containers in a path of travel, filling spouts moving synchronously with said container moving means, a filling head for supplying filling material to said filling spouts, said filling head including a plurality of ports each connected by a conduit to a separate source of supply, means for connecting said filling spouts serially to said ports, valve means for opening and closing said filling spouts, valve actuating means for opening and closing said filling spouts in synchronism with the connection of said filling spouts to said ports, said filling head comprising a pair of juxtaposed head elements in face-to-face contact, and pressure applying means for maintaining said head elements in tight contact with each other, said pressure applying means comprising a fluid cylinder which, when fluid pressure is applied thereto, acts to press said head elements into tight contact.

10. The filling machine claimed in claim 9 wherein said fluid cylinder is a pneumatic cylinder, and wherein air under pressure is provided to actuate said cylinder.

11. The filling machine claimed in claim 9 wherein a supply line connects said fluid cylinder with one of the conduits supplying filling material to said filling head, whereby the filling material diverted through said supply line actuates said cylinder.

12. In a filling machine, a filling head comprising a stationary head element and a rotary head element in face-to-face contacting relation, filling spouts connected to said rotary filling head element for rotation therewith, container moving means moving synchronously with said filling spouts, drive means for starting and stopping said machine, a plurality of elongated outlet ports in said stationary head element each connected by a conduit to a separate source of supply, inlet ports in said rotary head element for connecting said filling spouts serially to said elongated outlet ports, said elongated outlet ports being of a length substantially equal to the distance between the centers of adjacent inlet ports, whereby adjacent inlet ports will be jointly connected to a single outlet port, a valve means in each of said filling spouts for metering the flow of filling material therethrough, a valve actuating means contiguous to each of said outlet ports for opening and closing said valve means during the connection of the filling spouts to said outlet ports.

13. The filling machine claimed in claim 12 wherein said container moving means includes lifting platforms for juxtaposing containers to said filling spouts, and wherein means are provided to lower said lifting platforms relative to said filling spouts in synchronism with the introduction of a measured increment of filling material into the container.

14. The filling machine claimed in claim 13 wherein a measured increment of filling material is delivered through said filling spouts upon connection thereof to each of said outlet ports, and wherein the means for lowering said lifting platforms comprises a cam element adapted to lower said platforms in stages proportional to the level of the successive increments of filling material introduced into the containers.

15. In a filling machine, a filling head comprising a stationary head element and a rotary head element in face-to-face contacting relation, filling spouts connected to said rotary filling head element for rotation therewith, container moving means moving synchronously with said filling spouts, drive means for starting and stopping said machine, a plurality of elongated outlet ports in said stationary head element each connected by a conduit to a separate source of supply, spaced apart inlet ports in said rotary head element for connecting said filling spouts serially to said outlet ports, said outlet ports each being of a length substantially equal to the distance between the center lines of adjacent ones of said inlet ports, whereby adjacent inlet ports will be jointly connected to a single outlet port, a valve means in each of said filling spouts for metering the flow of filling material therethrough, said valve means including an arm carrying a cam follower, a separate valve actuating means contiguous to each of said outlet ports, said valve actuating means each comprising a cam track arranged to be contacted by said cam followers to open said filling spouts during the connection of the filling spouts to said outlet ports.

16. The filling machine claimed in claim 15 wherein said cam tracks are movable from an inoperative to an operative position, wherein means are provided to move the cam tracks from one position to the other, said last named means acting to move the cam tracks to the operative position upon starting of the machine and to move them to the inoperative position upon stoppage of the machine.

17. In a filling machine, the combination of means for moving containers in a path of travel, filling spouts moving synchronously with said container moving means, a filling head for supplying filling material to said filling spouts, said filling head including a plurality of ports each connected by a conduit to a source of supply, means connecting said filling spouts serially to said ports, valve means for opening and closing said filling spouts, valve actuating means movable from an operative to an inoperative position for opening and closing said valves in synchronism with the connection of said filling spouts to said ports, and control means responsive to the starting and stopping of the machine for moving said valve actuating means from one position to the other.

18. The filling machine claimed in claim 17 wherein said control means comprises a fluid pressure system including fluid cylinders for moving said valve actuating means and a control valve responsive to the starting of the machine to connect said cylinders to a source of fluid under pressure.

19. The filling machine claimed in claim 18 including pumps for said inlet ports, clutch means for starting and stopping said pumps, and a fluid cylinder forming a part of said fluid pressure system for moving said clutch means to engaged position, and means effective upon movement of said clutch means to engaged position to relieve the pressure in said last named cylinder so as to relieve the engaging pressure on said clutch means.

20. In a filling machine, the combination of means for moving containers in a path of travel, filling spouts moving synchronously with said container moving means, a filling head for supplying filling material to said filling spouts, said filling head including a port lying along a first radius and connected by a conduit to a source of supply, means for connecting said filling spouts serially to said port, valve means for opening and closing said filling spouts, valve actuating means for opening and closing said valves in synchronism with the connection of said filling spouts to said port, and a supplementary port in said filling head lying along a second radius, means for supplying an additional filling ingredient to said last mentioned port, and means for connecting said filling spouts serially to said last named port.

21. The filling machine claimed in claim 20 wherein said filling spouts each include an auxiliary filling tube for receiving filling material supplied by said supplementary port.

References Cited in the file of this patent

UNITED STATES PATENTS

| | | |
|---|---|---|
| 1,881,784 | Mallinckrodt | Oct. 11, 1932 |
| 2,184,117 | Fechheimer | Dec. 19, 1939 |
| 2,553,250 | Gross | May 15, 1951 |
| 2,600,982 | Fechheimer | June 17, 1952 |
| 2,672,272 | Harris et al. | Mar. 16, 1954 |